(12) United States Patent
Suefuji

(10) Patent No.: US 10,309,041 B2
(45) Date of Patent: Jun. 4, 2019

(54) STEEL CORD AND METHOD OF MANUFACTURING RUBBER PRODUCT

(71) Applicant: The Yokohama Rubber Co., LTD., Minato-ku, Tokyo (JP)

(72) Inventor: Ryotaro Suefuji, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 691 days.

(21) Appl. No.: 14/783,742

(22) PCT Filed: Apr. 3, 2014

(86) PCT No.: PCT/JP2014/059856
§ 371 (c)(1),
(2) Date: Oct. 9, 2015

(87) PCT Pub. No.: WO2014/168070
PCT Pub. Date: Oct. 16, 2014

(65) Prior Publication Data
US 2016/0201259 A1    Jul. 14, 2016

(30) Foreign Application Priority Data
Apr. 11, 2013   (JP) .................. 2013-082567

(51) Int. Cl.
*D02G 3/48*     (2006.01)
*B29C 47/02*    (2006.01)
(Continued)

(52) U.S. Cl.
CPC ............. *D02G 3/48* (2013.01); *B29C 47/025* (2013.01); *B29C 71/02* (2013.01); *B60C 9/0007* (2013.01);
(Continued)

(58) Field of Classification Search
CPC ......... D07B 1/0613; D07B 1/062; D02G 3/48
See application file for complete search history.

(56) References Cited

U.S. PATENT DOCUMENTS

| | | | |
|---|---|---|---|
| 34,862 A * | 4/1862 | Morgan et al. | 138/131 |
| 429,005 A * | 5/1890 | Bird | D07B 1/068 57/212 |

(Continued)

FOREIGN PATENT DOCUMENTS

| | | |
|---|---|---|
| JP | H06-297908 | 10/1994 |
| JP | 2005-248375 | 9/2005 |

(Continued)

OTHER PUBLICATIONS https://sciencing.com/how-8208660-calculate-denier.html (2017).*
International Search Report for International Application No. PCT/JP2014/059856 dated Jun. 10, 2014, 4 pages, Japan.

*Primary Examiner* — Shaun R Hurley
(74) *Attorney, Agent, or Firm* — Thorpe North & Western

(57) ABSTRACT

A steel cord has a stranded structure comprising a plurality of sheath strands intertwined around the outer circumferential surface of a core strand; and a filament having a linear mass density of at least 560 dtex and not more than 2,200 dtex wrapped in a spiral around the outer circumferential surface of the core strand. The steel cord is embedded in an unvulcanized rubber member to mold a molded rubber article, which is then vulcanized.

13 Claims, 6 Drawing Sheets

(51) Int. Cl.
  *B29C 71/02*   (2006.01)
  *D07B 1/06*    (2006.01)
  *B60C 9/00*    (2006.01)
  *B29K 9/06*    (2006.01)
  *B29K 305/12*  (2006.01)
  *B29L 31/00*   (2006.01)

(52) U.S. Cl.
  CPC .......... *D07B 1/062* (2013.01); *D07B 1/0613* (2013.01); *B29K 2009/06* (2013.01); *B29K 2305/12* (2013.01); *B29L 2031/7092* (2013.01); *D07B 1/0686* (2013.01); *D07B 2201/2052* (2013.01); *D07B 2201/2061* (2013.01); *D07B 2201/2074* (2013.01); *D07B 2501/2046* (2013.01)

(56) References Cited

U.S. PATENT DOCUMENTS

| | | | | |
|---|---|---|---|---|
| 1,312,872 | A * | 8/1919 | Rettinger | 245/1.5 |
| 4,498,282 | A * | 2/1985 | Graetz | D07B 1/148 116/200 |
| 5,323,596 | A * | 6/1994 | Nguyen | B60C 9/0007 152/527 |
| 6,658,836 | B2 * | 12/2003 | Nguyen | B60C 9/0007 57/218 |
| 6,855,423 | B2 * | 2/2005 | Fidan | D02G 3/38 152/451 |
| 7,448,631 | B2 * | 11/2008 | Shimizu | F16J 15/22 277/537 |
| 2002/0174645 | A1 * | 11/2002 | Nguyen | B60C 9/0007 57/213 |
| 2007/0098983 | A1 | 5/2007 | Akiyama et al. | |
| 2009/0205308 | A1 * | 8/2009 | Aoyama | B60C 9/0007 57/212 |
| 2011/0303337 | A1 * | 12/2011 | Michiels | B60C 9/22 152/536 |
| 2012/0298281 | A1 * | 11/2012 | Barguet | D07B 1/0633 152/556 |
| 2013/0318937 | A1 * | 12/2013 | Takeuchi | D07B 1/0686 57/220 |

FOREIGN PATENT DOCUMENTS

| | | |
|---|---|---|
| JP | 2008-285785 | 11/2008 |
| JP | 2012-036539 | 2/2012 |
| JP | 2005-248374 | 9/2015 |
| WO | WO 2004/090224 | 10/2004 |

* cited by examiner

STEEL CORD AND METHOD OF MANUFACTURING RUBBER PRODUCT

TECHNICAL FIELD

The present technology relates to a steel cord and a method of manufacturing a rubber product, and more specifically to a steel cord and method of manufacturing a rubber product that allow for suppression of reductions in cord strength caused by the heat of a vulcanization process.

BACKGROUND

Steel cords formed from intertwined steel wires are used as reinforcing material for rubber products such as tires, conveyor belts, and rubber hoses. One example is a stranded steel cord in which a plurality of sheath strands is intertwined around the outer circumferential surface of a core strand (for example, see Japanese Unexamined Patent Application Publication No. 2012-036539A). To manufacture these rubber products, a molded article is formed in which the steel cords constituting the reinforcing material are embedded in an unvulcanized rubber member, after which the molded article is heated at a predetermined temperature and compressed at a predetermined pressure in a vulcanization step to vulcanize the unvulcanized rubber.

In the case of stranded steel cords, the heat of the vulcanization process can make the cords brittle, increasing the occurrence of shearing and leading to a problematic reduction in cord strength. Increasing the diameter of the cord in order to suppress such reductions in cord strength introduces new problems such as increased cord weight and a reduction in flexibility. There is therefore a demand for a stranded steel cord that is capable of suppressing reductions in cord strength caused by the heat of a vulcanization process.

SUMMARY

The present technology provides a steel cord and a method of manufacturing a rubber product that allow for suppression of reductions in cord strength caused by the heat of a vulcanization process.

A steel cord according to the present technology is a stranded steel cord comprising a plurality of sheath strands intertwined around an outer circumferential surface of a core strand, characterized in that a filament having a linear mass density of at least 560 dtex and not more than 2,200 dtex is wrapped in a spiral around the outer circumferential surface of the core strand.

A method of manufacturing a rubber product according to the present technology comprises molding a molded rubber article by embedding the steel cord in an unvulcanized rubber member and vulcanizing the molded rubber article.

In accordance with the steel cord of the present technology, a filament having a linear mass density of at least 560 dtex and not more than 2,220 dtex is wrapped in a spiral around the outer circumferential surface of the core strand; this filament serves to provide a suitable level of cushioning between the core strand and the sheath strands, causing the shear stress between the two to be absorbed by the filament and reduced. Shearing is thus inhibited even if the steel cord is made brittle by the heat of the vulcanization process, allowing reductions in cord strength to be suppressed.

The filament is subjected, for example, to an RLF (Resorcinol Formaldehyde Latex) dip-treatment. Such an arrangement suppresses crushing of the filament during the vulcanization process while allowing for stronger integration with the vulcanized rubber.

Wrapping the filament in the direction opposite the twist direction of the core strand facilitates ensuring of the presence of spaces between the filament and the core strand, allowing the filament to function more effectively as cushioning between the core strand and the sheath strands.

In accordance with the method of manufacturing a rubber product according to the present technology, a molded rubber article molded by embedding the steel cord in an unvulcanized rubber member is vulcanized, thereby allowing the effects of the steel cord to be demonstrated in the manufactured rubber product. The rubber product is, for example, a conveyor belt, with the steel cord being embedded in the unvulcanized rubber member as a core.

BRIEF DESCRIPTION OF THE DRAWING(S)

DETAILED DESCRIPTION

Figure 1:
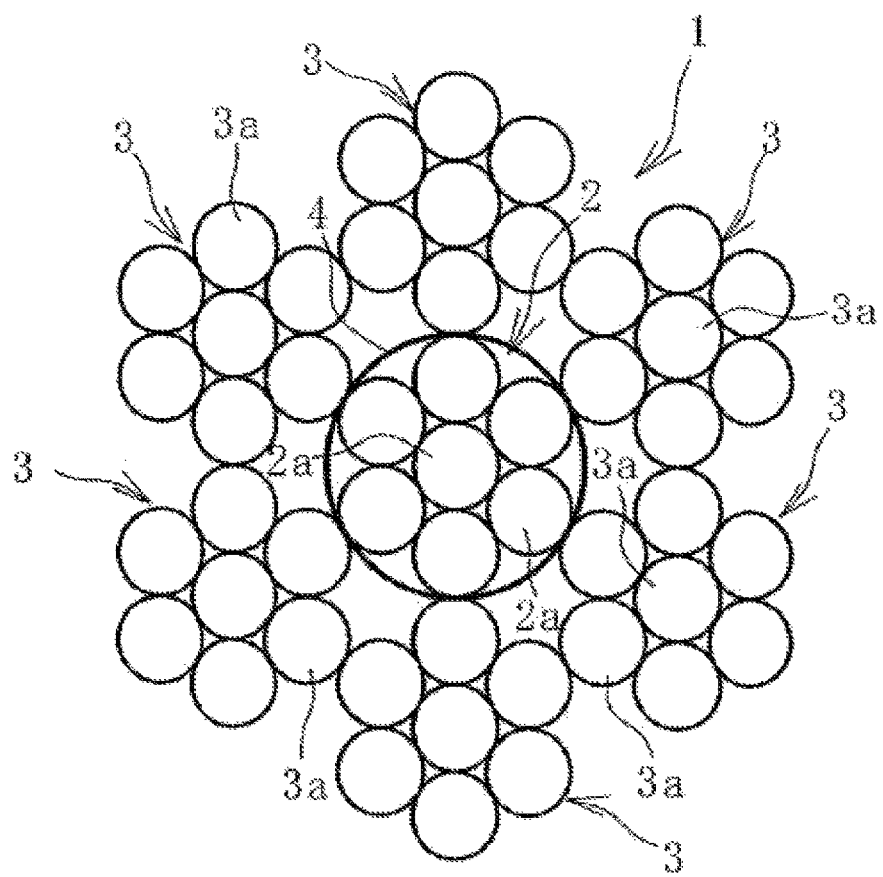
FIG. 1 is a side cross-sectional view illustrating a steel cord according to the present technology.

The steel cord and the method of manufacturing a rubber product according to the present technology will now be described with reference to the embodiments illustrated in the drawings.

As illustrated in FIG. 1, a steel cord 1 according to the present technology has a stranded structure in which a plurality of sheath strands 3 is intertwined around the outer circumferential surface of a core strand 2. The core strand 2 is formed by intertwining a plurality of wires 2a constituted by steel wire. The sheath strands 3 are formed by intertwining a plurality of wires 3a constituted by steel wire. The outer diameter of the wires 2a, 3a is about at least 0.2 mm and not more than 1.0 mm.

The steel cord 1 according to the embodiment has a 7×7 structure. The steel cord 1 is not limited to having a 7×7 structure, and any stranded structure is possible; examples include a 7×19, 19+7×7, or 7×W(19) structure.

A filament 4 having a linear mass density of at least 560 dtex (decitex) and not more than 2,200 dtex is wrapped in a spiral around the outer circumferential surface of the core strand 2. Examples of materials that can be used for the filament 4 include resins such as polyethylene, polypropylene, polyester, nylon 6, nylon 66, and aramid. There is no particular limitation upon the form of the filament 4, which may be constituted by a monofilament or by an intertwined cord.

Figure 2:
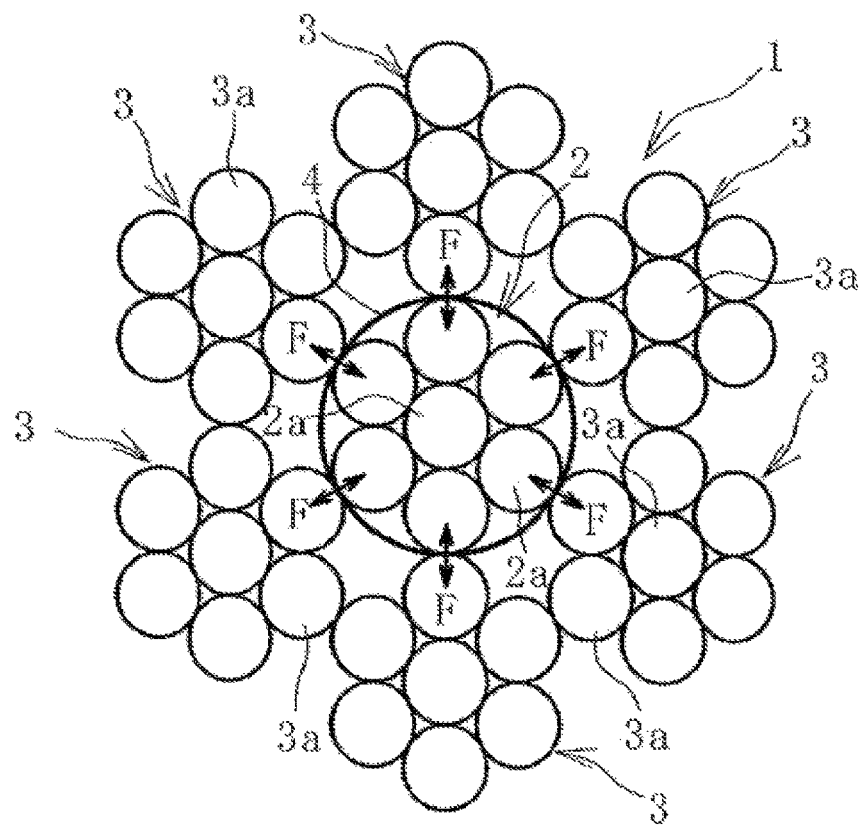
FIG. 2 is an explanatory illustration of shear stress acting upon the steel cord depicted in FIG. 1.

As illustrated in FIG. 2, shear stress F acts between facing wires 2a, 3a of the core strand 2 and sheath strands 3 of the stranded steel cord 1. In the present technology, the filament 4 is wrapped in a spiral around the outer circumferential surface of the core strand 2, thus interposing the filament 4 between the core strand 2 and the sheath strands 3 and reducing the area of direct contact between the two. By virtue of this structure, the filament 4 absorbs and reduces the shear stress F acting between facing wires 2*a*, 3*a* of the two to a certain degree. In other words, the filament 4 acts as cushioning.

Figure 3:
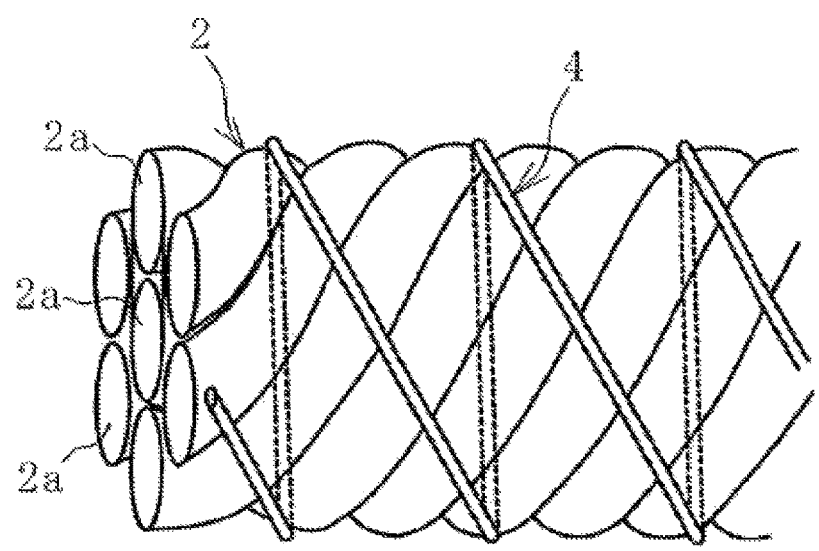
FIG. 3 is an explanatory illustration of a core strand around the outer circumferential surface of which a filament is wrapped in a spiral.

As illustrated in FIG. 3, the filament 4 is preferably wrapped in a direction opposite the twist direction of the core strand 2. Wrapping the filament 4 in this direction more easily ensures the presence of spaces between the filament 4 and the core strand 2 compared to an arrangement in which the filament is wrapped in the same direction as the twist direction of the core strand 2. As a result, the filament 4 is capable of more effectively functioning as cushioning between the core strand 2 and the sheath strands 3.

In the present embodiment, a single filament 4 is wrapped around the outer circumferential surface of the core strand 2, but it is also possible to wrap multiple (such as two, three) filaments 4 spaced at predetermined intervals (at a predetermined pitch) along the lengthwise direction of the core strand 2.

The filament 4 is preferably subjected to an RFL dip-treatment. In an RFL dip-treatment, the filament 4 is immersed in an RFL (resorcinol formaldehyde latex) treatment liquid, then dried to form a coating of the RFL treatment liquid on the surface of the filament 4.

A method of manufacturing a rubber product using the steel cord 1 will now be described using the example of a conveyor belt.

Figure 4:
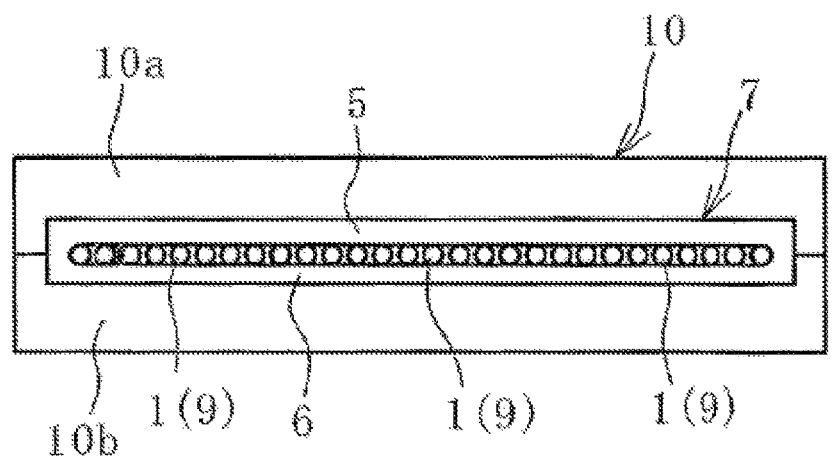
FIG. 4 is an explanatory illustration of a method of manufacturing a rubber product according to the present technology.

First, the molded rubber article 7 illustrated in FIG. 4 is molded. In the molded rubber article 7, steel cords 1 constituting cores 9 are sandwiched between an upper rubber cover 5 (unvulcanized rubber member) and a lower rubber cover 6 (unvulcanized rubber member). The plurality of steel cords 1 is drawn and arranged in the longitudinal direction of the molded rubber article 7, and embedded between the upper rubber cover 5 and the lower rubber cover 6 in this state. Generally, unvulcanized rubber serving as an adhesive is disposed between the layer of cores 9 formed by the arrayed steel cords 1 and the layers formed by the upper rubber cover 5 and the lower rubber cover 6.

Figure 5:
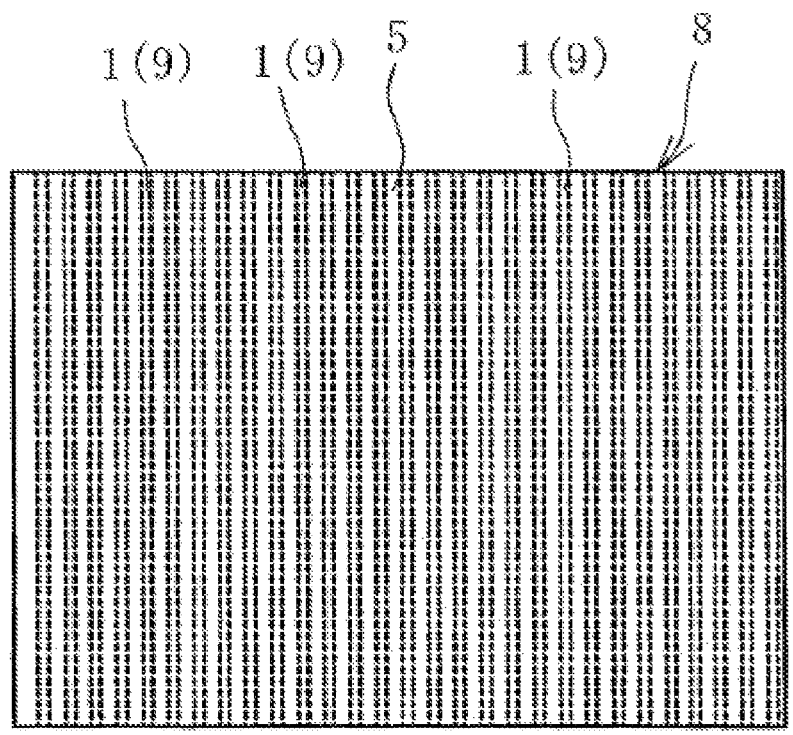
FIG. 5 is a plan view of a conveyor belt manufactured according to the method illustrated in FIG. 4.

The molded rubber article 7 is disposed between an upper die 10*a* and a lower die 10*b* of a vulcanization mold 10, and heated at a predetermined temperature and compressed at a predetermined pressure to vulcanize the upper rubber cover 5 and the lower rubber cover 6. Performing this vulcanization process manufactures the conveyor belt 8 illustrated in FIG. 5. The plurality of steel cords 1 in the conveyor belt 8, which are disposed at predetermined intervals in the belt width direction, extend in the longitudinal direction of the belt.

The steel cords 1 are made more brittle than before by the heat of the vulcanization process. Thus, if the filaments 4 were not provided, the shear stress F acting between the core strands 2 and the sheath strands 3 would cause shearing to become the dominant failure mode of the steel cords 1, reducing cord strength. In the present technology, the shear stress F is absorbed and reduced to a certain degree by the filament 4 despite the increased brittleness of the steel cords 1 due to the heat of the vulcanization process. This allows reductions in cord strength to be suppressed.

As a result, the diameters of the steel cords 1 can be reduced while obtaining the same cord strength. This contributes to reductions in the weight of the steel cords 1, and thus the rubber product. This is extremely valuable in the case of a conveyor belt 8, as reductions in the cord strength of the cores 9, which bear the tension when the conveyor belt 8 is slung between pulleys, can be suppressed. The reduction in the diameter of the steel cords 1 also improves bending resistance (i.e., durability against repeated bending).

If the linear mass density of the filament 4 is less than 560 dtex, the effect of mitigating the shear stress F described above will be attenuated, making it impossible to sufficiently suppress reductions in cord strength. Conversely, a linear mass density exceeding 2,200 dtex will inhibit the even distribution of force across the steel cord 1 as a whole, thereby leading to a reduction in strength. The penetration of rubber into the steel cord 1 will also become uneven, leading to degradation in air permeability. For these reasons, the linear mass density of the filament 4 is set to at least 560 dtex and not more than 2,200 dtex.

If the wrapping pitch P of the filament 4 is less than ⅕ the cord pitch, the presence of the filament 4 will inhibit the penetration of unvulcanized rubber into the spaces between the core strand 2 and the sheath strands 3 during the vulcanization process. This tends to negatively affect the strength of the bond between the steel cord 1 (core strand 2) and the vulcanized rubber. Conversely, if the wrapping pitch P exceeds five times the cord pitch, the effect of mitigating the shear stress F described above will be attenuated, making it difficult to sufficiently suppress reductions in cord strength. For these reasons, the wrapping pitch P of the filament 4 is preferably set to about at least ⅕ the cord pitch and not more than five times the cord pitch. In this context, "cord pitch" refers to the pitch of the sheath strands 3 when intertwined around the core strand 2.

The preferred wrapping pitch P described above is a value (range) for cases in which a single filament 4 is wrapped around the outer circumferential surface of the core strand 2 in the opposite direction as the twist direction of the core strand 2. If there are two filaments 4, the wrapping pitch P of each filament 4 is preferably twice the wrapping pitch P in the case of a single filament 4. Similarly, if there are three filaments 4, the wrapping pitch P of each filament 4 is preferably three times the wrapping pitch P in the case of a single filament 4.

If the filament 4 is wrapped in the same direction as the twist direction of the core strand 2, the wrapping pitch P is preferably a value (range) that is within the preferred range for cases in which the filament 4 is wrapped in the opposite direction as the twist direction of the core strand 2 and is as far from the twist pitch of the core strand 2 as possible.

RFL dip-treating the filament 4 allows for stronger integration with the vulcanized rubber while suppressing crushing of the filament 4 during the vulcanization process. This makes it easier to ensure uniform cord strength.

Figure 6:
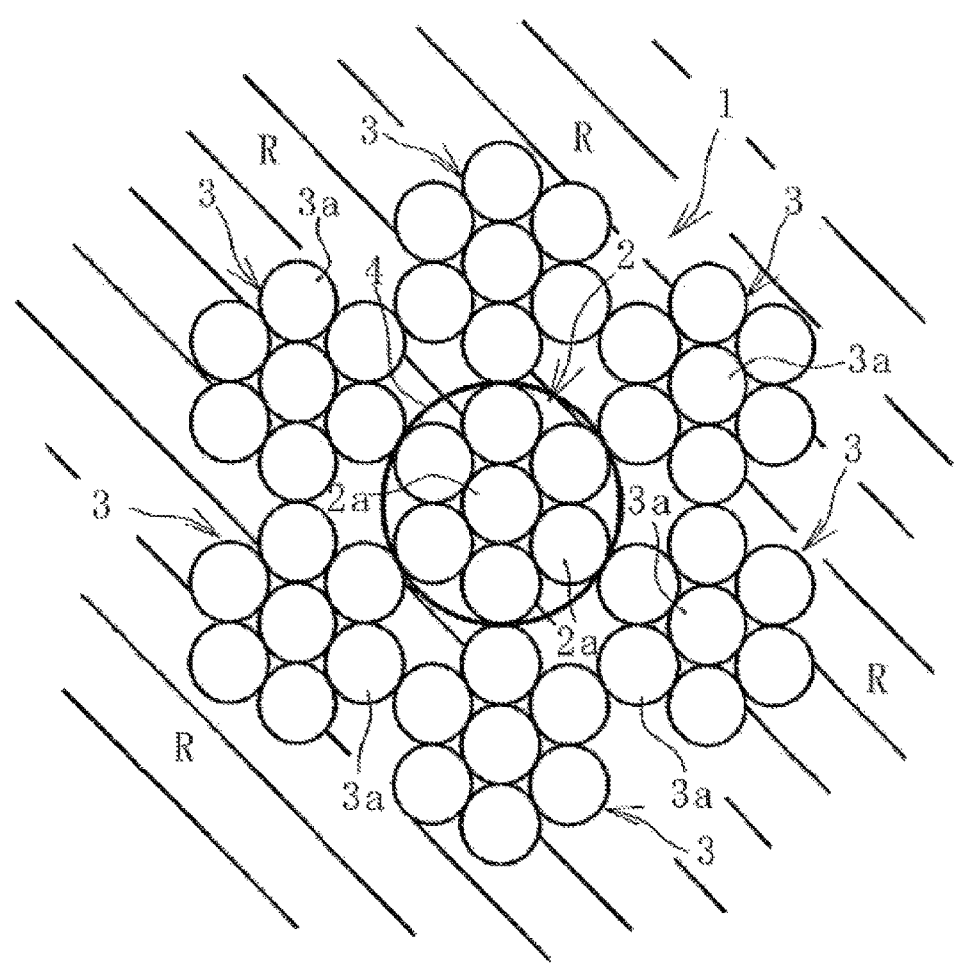
FIG. 6 is a schematic magnified illustration of the area around the steel cord illustrated in FIG. 5.

In the present technology, the filament 4 is wrapped in a spiral around the outer circumferential surface of the core strand 2, thereby allowing the unvulcanized rubber to more easily penetrate into the spaces between the core strand 2 and the sheath strands 3, as shown in FIG. 6, after the molded rubber article 7 has been vulcanized. By contrast, if the outer circumferential surface of the core strand 2 is simply covered, for example, with cushioning material such as fabric, the cushioning material may inhibit the penetration of unvulcanized rubber into the spaces between the core strand 2 and sheath strands 3. However, the present technology yields notably superior penetration of unvulcanized rubber into these spaces. This is advantageous for more thoroughly filling of the spaces between the core strand 2 and the sheath strands 3 with the vulcanized rubber R. As a result, a stronger vulcanization bond can be formed between the steel cords 1 and the vulcanized rubber R.

The rubber product manufactured according to the present technology is not limited to a conveyor belt 8; various other examples of rubber products in which steel cords 1 are embedded as reinforcing material, such as tires, rubber hoses, marine hoses, and boat/ship fenders, are possible. The present technology can be especially suitably applied to the manufacturing of a conveyor belt 8 or a heavy-duty tire (for use on large construction machinery or the like), in which the importance of the cord strength of the steel cords 1 is relatively high.

EXAMPLES

Steel cords having a structure identical to that illustrated in FIGS. 1 and 3 (Working Examples 1 to 5, Comparative Examples 1, 2) and a steel cord having the structure illustrated in FIGS. 1 and 3 in which the filament wrapped in a spiral around the outer circumferential surface of the core strand has been removed from the steel cord (Conventional Example) were embedded under identical conditions in unvulcanized rubber (natural rubber/styrene-butadiene rubber), the rubber was vulcanized for 20 minutes, and the steel cords were removed after vulcanization to create test samples, which were measured for steel cord strength, break elongation, and air permeability. Results are shown in Table 1. Data for the conventional steel cord prior to vulcanization is included as a reference example. The steel cords of the various test samples each had an outer diameter of 4 mm, and a filament of polyester resin was used as the filament. The filament was wrapped in a spiral in the direction opposite the twist direction of the core strand.

[Cord Strength] [Break Elongation]

The test samples were tensed in the longitudinal direction until failure according to JIS (Japanese Industrial Standard) G 3510:1992, and the load at breakage was taken as the cord strength and the elongation at failure was taken as the break elongation.

[Air Permeability]

Air pressure of 100 kPa was pumped into one longitudinal end of each test sample according to the "Air Permeability Testing Method" of Australian Standard AS-1333, and the air pressure which permeated to the other end in the 60 seconds after the air pressure was pumped was measured. Results are shown in Table 1. The lower this air pressure is, the greater the air permeation resistance of the sample is, indicating superior permeability of the rubber with respect to the steel cord. An air pressure of less than 5 kPa is considered as indicating sufficient air permeation resistance.

TABLE 1

| | | Reference Example | Conventional Example | Comparative Example 1 | Comparative Example 2 |
|---|---|---|---|---|---|
| Vulcanization | | Absent | Present | Present | Present |
| Filament | Linear mass density (dtex) | — | — | 440 | 3300 |
| | Wrapping pitch P (cord pitch multiple) | — | — | 1.0 | 1.0 |
| RFL Dip treatment | | — | — | Absent | Present |
| Cord strength (kN) | | 17.9 | 16.0 | 16.0 | 15.4 |
| Break elongation (%) | | 3.0 | 2.7 | 2.7 | 2.2 |
| Air permeability (kPa) | | — | 0 | 0 | 8 |

TABLE 1-continued

| | | Working Example 1 | 2 | 3 | 4 | 5 |
|---|---|---|---|---|---|---|
| Vulcanization | | Present | Present | Present | Present | Present |
| Filament | Linear mass density (dtex) | 560 | 1670 | 1670 | 1670 | 2200 |
| | Wrapping pitch P (cord pitch multiple) | 1.0 | 1.0 | 1.0 | 3.0 | 1.0 |
| RFL Dip treatment | | Absent | Absent | Present | Absent | Absent |
| Cord strength (kN) | | 16.6 | 16.9 | 17.9 | 17.7 | 17.6 |
| Break elongation (%) | | 2.7 | 2.7 | 2.8 | 2.7 | 2.8 |
| Air permeability (kPa) | | 0 | 0 | 0 | 0 | 0 |

It is apparent from the results shown in Table 1 that Working Examples 1 to 5 allow for a suppression of reductions in cord strength compared to the Conventional Example. It is also apparent that the working examples have a level of air permeability that is unproblematic for practical purposes. Comparative Example 1 has a cord strength comparable to that of the Conventional Example. Comparative Example 2 exhibits reduced strength and poorer air permeability compared to the Conventional Example.

What is claimed is:

1. A stranded steel cord comprising a plurality of sheath strands intertwined around an outer circumferential surface of a core strand, the cord being characterized in that an intertwined cord having a linear mass density of at least 1401 dtex and not more than 2,200 dtex is wrapped in a spiral around the outer circumferential surface of the core strand, wherein the intertwined cord comprises a plurality of intertwined filaments, and a wrapping pitch of the intertwined cord is at least ⅕ a cord pitch and not more than five times the cord pitch, the cord pitch being the pitch of the sheath strands intertwined around the core strand.

2. The steel cord according to claim 1, wherein only the intertwined cord is Resorcinol Formaldehyde Latex dip-treated.

3. The steel cord according to claim 2, wherein the intertwined cord is wrapped in a direction opposite a twist direction of the core strand.

4. A method of manufacturing a rubber product, the method comprising the steps of: molding a molded rubber article by embedding the steel cord described in claim 3 in an unvulcanized rubber member; and vulcanizing the molded rubber article.

5. The method of manufacturing a rubber product according to claim 4, wherein the rubber product is a conveyor belt, and the steel cord is embedded in the unvulcanized rubber member as a core.

6. A method of manufacturing a rubber product, the method comprising the steps of: molding a molded rubber article by embedding the steel cord described in claim 2 in an unvulcanized rubber member; and vulcanizing the molded rubber article.

7. The method of manufacturing a rubber product according to claim 6, wherein the rubber product is a conveyor belt, and the steel cord is embedded in the unvulcanized rubber member as a core.

8. The steel cord according to claim 1, wherein the intertwined cord is wrapped in a direction opposite a twist direction of the core strand.

9. A method of manufacturing a rubber product, the method comprising the steps of: molding a molded rubber article by embedding the steel cord described in claim 8 in an unvulcanized rubber member; and vulcanizing the molded rubber article.

10. The method of manufacturing a rubber product according to claim 9, wherein the rubber product is a conveyor belt, and the steel cord is embedded in the unvulcanized rubber member as a core.

11. The steel cord according to claim 1, wherein the sheath and core strands each comprise a plurality of metal filaments and an outer diameter of each of the metal filaments is at least 0.2 mm and not more than 1.0 mm.

12. A method of manufacturing a rubber product, the method comprising the steps of: molding a molded rubber article by embedding the steel cord described in claim 1 in an unvulcanized rubber member; and vulcanizing the molded rubber article.

13. The method of manufacturing a rubber product according to claim 12, wherein the rubber product is a conveyor belt, and the steel cord is embedded in the unvulcanized rubber member as a core.

* * * * *